May 17, 1938.   H. BANY   2,117,871
AUTOMATIC CONTROL EQUIPMENT
Filed Feb. 18, 1937
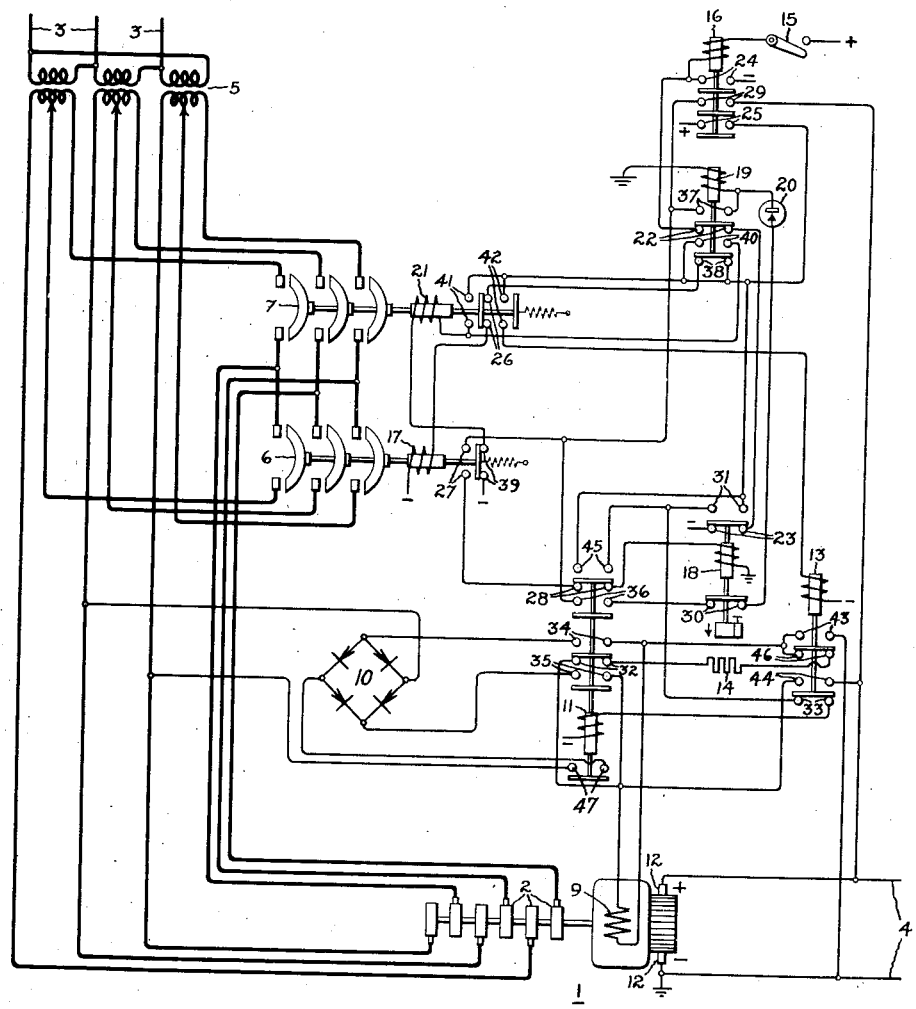
Inventor:
Herman Bany,
by Harry E. Dunham
His Attorney.

Patented May 17, 1938

2,117,871

UNITED STATES PATENT OFFICE 2,117,871

AUTOMATIC CONTROL EQUIPMENT

Herman Bany, Lansdowne, Pa., assignor to General Electric Company, a corporation of New York Application February 18, 1937, Serial No. 126,376

10 Claims. (Cl. 171—123)

My invention relates to automatic control equipments for dynamo-electric machines, and particularly to such equipments for synchronous converters, and an object of my invention is to provide a simple and improved control equipment of the above type in which a plurality of electromagnetically actuated devices are interconnected so that they operate automatically in the proper sequence to control the automatic starting of a synchronous converter.

My invention will be better understood from the following description when taken in connection with the accompanying drawing, the single figure of which diagrammatically illustrates the apparatus and circuit connections employed in an automatic synchronous converter control equipment embodying my invention and its scope will be pointed out in the appended claims.

Referring to the drawing, the single figure of which diagrammatically illustrates an automatic synchronous converter control equipment embodying my invention, I represents a synchronous converter, the collector rings 2 of which are arranged to be connected to a suitable source of alternating current such as an alternating current supply circuit 3. The converter I is arranged to supply direct current to a direct current distribution circuit 4. A transformer 5 is interposed between the alternating current supply circuit 3 and the collector rings 2 of the converter I and is provided with suitable taps on its secondary winding so that a relatively low voltage may be impressed upon the collector rings while the converter is being started and normal voltage may be impressed upon the collector rings 2 during the normal operation of the converter. Any suitable switching means may be provided for controlling the connections between the secondary windings of the transformer 5 of the collector rings 2. As shown in the drawing, a contactor 6 is provided for connecting the low voltage secondary taps of the transformer 5 to the collector rings 2 and a contactor 7 is provided for connecting the high voltage secondary taps of the transformer 5 to the collector rings 2.

The converter I is provided with a field winding 9 which is arranged to be connected by suitable switching means II to a separate source of direct current having a definite polarity such as a full-wave rectifier 10 of the contact type supplied from the secondary of the transformer 5. The field winding 9 is also arranged to be connected across the direct current brushes 12 of the converter by means of another suitable switching device 13. Preferably, the field winding 9 is arranged to be short-circuited through a discharge resistor 14 when it is disconnected from both the separate source of excitation 10 and the direct current brushes 12.

In order to start and stop the synchronous converter I, a hand switch 15 is provided which, when closed, initiates the starting of the converter I, and which, when opened effects the stopping of the converter I. It is to be understood, however, that any other well-known means, which may be either automatically or manually actuated, may be used to effect the starting and stopping of the converter I. As shown in the drawing, the closing of the switch 15 completes an energizing circuit for a control relay 16, if the converter I is in an operative condition to be started. When the relay 16 is energized in response to the operation of the control switch 15, the relay effects the completion of an energizing circuit for the operating winding 17 of the starting contactor 6 so that the collector rings 2 are connected to the low voltage taps of the transformer 5 to establish the starting armature connections for the converter I.

In order that the converter I may be pulled into synchronism with the correct polarity in case the polarity builds up in the wrong direction while the converter is accelerating, the switching means II is arranged to connect the field winding 9 of the converter to the source of excitation 10 when the converter reaches synchronous speed. This result is accomplished by having the starting contactor 6, when in its closed position, complete an energizing circuit for a speed responsive relay 18 across the brushes 12 of the converter I. The relay 18 is constructed in any suitable manner so that it responds only to direct current and therefore only operates when the converter I reaches synchronous speed. I provide suitable polarity responsive means for checking the polarity of the converter after the switch II has been closed and a sufficient time has elapsed thereafter to allow the current conditions in the circuits of the converter to become stable in case the closing of the switch II has effected a reversal in the polarity of the converter. In the arrangement shown in the drawing, the polarity responsive arrangement consists of a relay 19 and a half-wave rectifier 20 which are connected in series across the brushes 12 of the converter I when the switch II is closed and the relay 18 is in its deenergized position. The desired delay in the connection of the relay 19 and the half-wave rectifier 20 across the brushes 12 after the switch II is closed is obtained by having the switch 11, when it closes, interrupt the energizing circuit of the relay 18 which is designed in any suitable manner so that it does not return to its deenergized position until after it has been deenergized for a predetermined time.

The energization of the relay 19 in response to a predetermined polarity of the converter 1 effects the opening of the switch 6 and the closing of the switch 7 so as to establish the running armature connections for the converter 1. The closing of the switch 7 also effects the closing of the switch 13 and the opening of the switch 11 so that the field winding 9 is connected across the brushes 12 and is disconnected from the separate source of excitation 10.

The operation of the control equipment shown in the drawing is as follows: When the control switch 15 is closed to effect the starting of the converter 1, a circuit is completed for the relay 16 through the contacts 22 of the relay 19 and the contacts 23 of the relay 18. By closing its contacts 24, the relay 16 completes a locking circuit for itself which is independent of the contacts 22 and 23 of the relays 19 and 18, respectively. The closing of the contacts 25 of the relay 16 completes through contacts 38 of relay 19 and contacts 26 of the switch 7 an energizing circuit for the operating coil 17 of the starting switch 6 so that the collector rings 2 of the converter 1 are connected to the low voltage secondary terminals of the transformer 5. As soon as the starting contactor 6 closes, the converter 1 starts from rest and accelerates to synchronous speed. During the starting operation the discharge resistor 14 is connected across the terminals of the field winding 9 by the contacts 32 of switch 11 and the contacts 46 of the switch 13.

The closing of the starting switch 6 also connects the relay 18 across the brushes 12 of the converter 1 through contacts 28 of the switch 11, contacts 27 of switch 6 and contacts 29 of the relay 16. As long as the converter is rotating at a speed below synchronous speed, the current flowing through the winding of relay 18 is an alternating current. When, however, the converter reaches synchronous speed direct current flows through the winding of relay 18 and this relay then operates to open its contacts 23 and 30 and close its contacts 31. The closing of relay 18 completes through its contacts 31, contacts 25 of relay 16 and contacts 33 of switch 13 an energizing circuit for the operating winding of switch 11. The closing of contacts 45 of switch 11 completes a shunt circuit around the contacts 31 in the energizing circuit for the operating winding of switch 11. By opening its contacts 32, the switch 11 disconnects the discharge resistor 14 from across the terminals of the field winding 9 and by closing its contacts 47, 34 and 35 the switch 11 connects the contact rectifiers constituting the separate source of excitation 10 across one phase of the secondary circuit of the transformer 5 and connects the field winding 9 to the separate source of excitation 10 to pull the converter into synchronism with the right polarity. By opening its contacts 28, switch 11 effects the deenergization of the relay 18, which, after being deenergized for a predetermined length of time, returns to its deenergized position, in which position contacts 23 and 30 are closed. The closing of the contacts 30 of relay 18 completes a circuit for the relay 19 and its half-wave rectifier 20 across the brushes of the converter 12 through contacts 36 of switch 11 and contacts 29 of relay 16. If the converter is now operating into synchronism with the desired polarity, relay 19 operates, and by closing its contacts 37 completes a locking circuit for itself independently of the half-wave rectifier 20 and the contacts 30 of relay 18 and contacts 36 of switch 11. The opening of the contacts 38 of relay 19 interrupts the energizing circuit for the operating winding 17 of the starting contactor 6 so that the contactor 6 opens and disconnects the collector rings 2 from the low voltage secondary taps on the transformer 5. The closing of the contacts 39, when the starting contactor 6 opens, completes an energizing circuit for the operating coil 21 of the running contactor 7 through contacts 40 of the relay 19 and contacts 25 of the relay 16. The closing of the running switch 7 connects the collector rings 2 to the normal operating terminals of the transformer 5. By closing its contacts 41, the contactor 7 completes a shunt circuit around the contacts 40 of relay 19 in the energizing circuit of the operating winding 21. The closing of the contacts 42 on the running switch 7 completes, through contacts 25 of relay 16, an energizing circuit for the operating winding of switch 13. By opening its contacts 33, the switch 13 effects the deenergization of the operating winding of the switch 11 so that the field winding 9 is disconnected from the separate source of excitation 10. By closing its contacts 43 and 44, the switch 13 connects the field winding 9 across the brushes 12 of the converter so that the converter is now operating at synchronous speed with the correct polarity and with its field winding 9 self-excited.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a source of alternating current, a synchronous converter, a separate source of excitation, polarity responsive means, means for connecting said converter to said source of alternating current, means controlled by the speed of said converter for connecting the field winding of said converter to said source of excitation, and timing means controlled by said excitation connecting means for connecting said polarity responsive means across the direct current brushes of said converter.

2. In combination, a source of alternating current, a synchronous converter, a separate source of excitation, polarity responsive means, means for connecting said converter to said source of alternating current, a relay connected to the direct current brushes of the converter and operative when said converter operates at synchronous speed, means responsive to the operation of said relay for connecting the field winding of said converter to said source of excitation and for effecting the deenergization of said relay, and means responsive to the return of said relay to its deenergized position for connecting said polarity responsive means across the direct current brushes of said converter.

3. In combination, a source of alternating current, a synchronous converter, a separate source of excitation, polarity responsive means, means for connecting said converter to said source of alternating current, a relay connected to the direct current brushes of the converter and operative when said converter operates at synchronous speed, means responsive to the operation of said relay for connecting the field winding of said converter to said source of excitation and for effecting the deenergization of said relay, means for delaying the return of said relay to its deenergized position when said relay is deenergized, and means responsive to the return of said relay to its deenergized position for connecting said polarity responsive means across the direct current brushes of said converter.

4. In combination, a synchronous converter, starting and running armature connections for said converter, a source of excitation, polarity responsive means, means for establishing said starting armature connections to start said converter, means controlled by the speed of said converter for connecting the field winding of said converter to said source of excitation, timing means controlled by said excitation connecting means for connecting said polarity responsive means across the direct current brushes of said converter, and means responsive to the operation of said polarity responsive means for establishing the running armature connections for said converter.

5. In combination, a synchronous converter, starting and running armature connections for said converter, a source of excitation, polarity responsive means, means for establishing said starting armature connections to start said converter, a relay connected to the direct current brushes of the converter and operative when said converter operates at synchronous speed, means responsive to the operation of said relay for connecting the field winding of said converter to said source of excitation and for effecting the deenergization of said relay, means responsive to the return of said relay to its deenergized position for connecting said polarity responsive means across the direct current brushes of said converter, and means responsive to the operation of said polarity responsive means for establishing the running armature connections of said converter.

6. In combination, a synchronous converter, starting and running armature connections for said converter, a source of excitation, polarity responsive means, means for establishing said starting armature connections to start said converter, a relay connected to the direct current brushes of the converter and operative when said converter operates at synchronous speed, means responsive to the operation of said relay for connecting the field winding of said converter to said source of excitation and for effecting the deenergization of said relay, means for delaying the return of said relay to its deenergized position when said relay is deenergized, means responsive to the return of said relay to its deenergized position for connecting said polarity means across the direct current brushes of said converter, and means responsive to the operation of said polarity responsive means for establishing the running armature connections of said converter.

7. In combination, a synchronous converter, starting and running armature connections for said converter, a source of excitation, polarity responsive means, means for establishing said starting armature connections to start said converter, means controlled by the speed of said converter for connecting the field winding of said converter to said source of excitation, timing means controlled by said excitation connecting means for connecting said polarity responsive means across the direct current brushes of said converter, means responsive to the operation of said polarity responsive means for establishing the running armature connections for said converter, and means responsive to the establishment of said running armature connection for connecting the field winding of said converter across the direct current brushes thereof.

8. In combination, a synchronous converter, starting and running armature connections for said converter, a source of excitation, polarity responsive means, means for establishing said starting armature connections to start said converter, a relay connected to the direct current brushes of the converter and operative when said converter operates at synchronous speed, means responsive to the operation of said relay for connecting the field winding of said converter to said source of excitation and for effecting the deenergization of said relay, means for delaying the return of said relay to its deenergized position when said relay is deenergized, means responsive to the return of said relay to its deenergized position for connecting said polarity means across the direct current brushes of said converter, means responsive to the operation of said polarity responsive means for establishing the running armature connections of said converter, and means responsive to the establishment of said running armature connection for connecting the field winding of said converter across the direct current brushes thereof.

9. In combination, a synchronous converter, starting and running armature connections for said converter, a source of excitation, means for establishing said starting armature connections to start said converter, means controlled by the speed of said converter for connecting the field winding of said converter to said source of excitation, means responsive to a predetermined polarity across the direct current brushes of said converter after the field winding is connected to said source of excitation for establishing said running armature connections, and means responsive to the establishment of said running armature connections for connecting the field winding of said converter across the direct current brushes thereof.

10. In combination, a synchronous converter, starting and running armature connections for said converter, a source of excitation, means for establishing said starting armature connections to start said converter, means controlled by the speed of said converter for connecting the field winding of said converter to said source of excitation, means responsive to a predetermined polarity across the direct current brushes of said converter after the field winding is connected to said source of excitation for establishing said running armature connections, and means responsive to the establishment of said running armature connections for disconnecting the field winding of said converter from said source of excitation and for connecting the field winding across the direct current brushes of the converter.

HERMAN BANY.